US008793303B2

(12) United States Patent
Speicher et al.

(10) Patent No.: US 8,793,303 B2
(45) Date of Patent: Jul. 29, 2014

(54) COMPOSITION OF LOCAL USER INTERFACE WITH REMOTELY GENERATED USER INTERFACE AND MEDIA

(75) Inventors: Ashley C. Speicher, Redmond, WA (US); Nicholas J. Fang, Redmond, WA (US); Todd Bowra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 11/478,501

(22) Filed: Jun. 29, 2006

(65) Prior Publication Data

US 2008/0005302 A1    Jan. 3, 2008

(51) Int. Cl.
*G06F 15/16* (2006.01)
*G06F 3/048* (2013.01)
*H04L 12/28* (2006.01)
*H04L 29/06* (2006.01)

(52) U.S. Cl.
CPC ............ *H04L 12/282* (2013.01); *H04L 65/604* (2013.01)
USPC ........................................................ 709/203

(58) Field of Classification Search
CPC ............................. H04L 12/282; H04L 65/604
USPC .................. 709/203, 217, 231, 232; 715/788, 715/790–793; 725/133, 135, 141
See application file for complete search history.

(56) References Cited

U.S. PATENT DOCUMENTS

| | | | | |
|---|---|---|---|---|
| 5,859,639 | A * | 1/1999 | Ebrahim | 715/788 |
| 6,493,008 | B1 * | 12/2002 | Yui | 715/840 |
| 6,518,985 | B2 * | 2/2003 | Ozcelik et al. | 715/794 |
| 6,809,776 | B1 * | 10/2004 | Simpson | 348/565 |
| 6,816,883 | B2 | 11/2004 | Baumeister et al. | |
| 6,839,071 | B1 * | 1/2005 | Miyamoto | 715/788 |

(Continued)

FOREIGN PATENT DOCUMENTS

| | | | |
|---|---|---|---|
| JP | 07-274140 | 10/1995 | |
| JP | 10-074080 | * 3/1998 | ............... G09G 5/38 |
| JP | 2003-316490 | 11/2003 | |
| WO | WO 00/33208 | 6/2000 | |

OTHER PUBLICATIONS

International Search Report PCT/US2007/014791, dated Nov. 19, 2007, pp. 1-7.

(Continued)

*Primary Examiner* — Rupal Dharia
*Assistant Examiner* — Wing Ma
(74) *Attorney, Agent, or Firm* — Micah Goldsmith; Glen Johnson; Micky Minhas

(57) ABSTRACT

A media server in a home entertainment network coordinates with a media receiver connected with the network to provide a media representation with a combined user interface on an attached display device. The media server receives compositing information from the media receiver over the network regarding the placement of UI components generated by the media receiver. In response, the media server may adjust the positioning of graphics, media control information, metadata, media presentation windows, and other UI components for presentation by the media receiver such that the UI components generated by the media server do not interfere with the UI generated by the media receiver when rendered to the display device. Alternately, the media receiver may adjust the position of UI components such that the UI components generated by the media receiver do not interfere with the UI generated by the media server upon presentation.

20 Claims, 5 Drawing Sheets

(56) References Cited

U.S. PATENT DOCUMENTS

| | | | |
|---|---|---|---|
| 7,168,086 B1* | 1/2007 | Carpenter et al. | 725/98 |
| 7,313,591 B2 | 12/2007 | Eames et al. | |
| 7,362,381 B1* | 4/2008 | Stahl et al. | 348/569 |
| 7,844,661 B2 | 11/2010 | Fang et al. | |
| 8,352,544 B2 | 1/2013 | Fang et al. | |
| 2001/0026386 A1* | 10/2001 | Yamamoto et al. | 359/142 |
| 2002/0111995 A1* | 8/2002 | Mansour et al. | 709/203 |
| 2002/0138593 A1 | 9/2002 | Novak et al. | |
| 2002/0171670 A1* | 11/2002 | Clernock et al. | 345/629 |
| 2003/0052905 A1* | 3/2003 | Gordon et al. | 345/700 |
| 2003/0097452 A1 | 5/2003 | Kim et al. | |
| 2003/0188321 A1* | 10/2003 | Shoff et al. | 725/135 |
| 2003/0234811 A1 | 12/2003 | Kim | |
| 2004/0001163 A1* | 1/2004 | Park | 348/569 |
| 2004/0039834 A1 | 2/2004 | Saunders et al. | |
| 2004/0078470 A1 | 4/2004 | Baumeister et al. | |
| 2004/0103207 A1 | 5/2004 | Elman et al. | |
| 2004/0177063 A1 | 9/2004 | Weber et al. | |
| 2004/0267940 A1 | 12/2004 | Dideriksen et al. | |
| 2004/0267952 A1 | 12/2004 | He et al. | |
| 2005/0015712 A1 | 1/2005 | Plastina et al. | |
| 2005/0138192 A1 | 6/2005 | Encarnacion et al. | |
| 2005/0149639 A1 | 7/2005 | Vrielink et al. | |
| 2006/0020879 A1 | 1/2006 | Eames et al. | |
| 2006/0069797 A1 | 3/2006 | Abdo et al. | |
| 2006/0080382 A1 | 4/2006 | Dutta et al. | |
| 2006/0174021 A1* | 8/2006 | Osborne et al. | 709/230 |
| 2006/0174026 A1* | 8/2006 | Robinson et al. | 709/231 |
| 2006/0224691 A1* | 10/2006 | Dutta et al. | 709/217 |
| 2006/0230427 A1* | 10/2006 | Kunkel et al. | 725/133 |
| 2007/0005727 A1* | 1/2007 | Edwards et al. | 709/218 |
| 2007/0005783 A1* | 1/2007 | Saint-Hillaire et al. | 709/230 |
| 2007/0005795 A1 | 1/2007 | Gonzalez | |
| 2007/0022207 A1 | 1/2007 | Millington | |
| 2007/0050294 A1* | 3/2007 | Trottier et al. | 705/50 |
| 2007/0078876 A1 | 4/2007 | Hayashi et al. | |
| 2007/0078883 A1 | 4/2007 | Hayashi et al. | |
| 2007/0078898 A1 | 4/2007 | Hayashi et al. | |
| 2007/0081100 A1* | 4/2007 | Yui | 348/587 |
| 2007/0136778 A1 | 6/2007 | Birger et al. | |
| 2007/0162971 A1 | 7/2007 | Blom et al. | |
| 2007/0192486 A1* | 8/2007 | Wilson et al. | 709/225 |
| 2008/0034029 A1 | 2/2008 | Fang et al. | |
| 2011/0072081 A1 | 3/2011 | Fang et al. | |

OTHER PUBLICATIONS

Jain et al., Metadata in Video Databases, ACM SIGMOD Record, vol. 23, Issue 4, Dec. 1994, pp. 27-33.

Bell et al., A Call for the Home Media Network, Communications of the ACM, vol. 45, Issue 7, Jul. 2002, pp. 71-75.

Office Action from the State Intellectual Property Office of The People's Republic of China regarding Application No. 200780024463.X dated Jun. 22, 2011.

Extended European Search Report from the European Patent Office regarding Application No. 07796452.6 dated May 3, 2012.

* cited by examiner

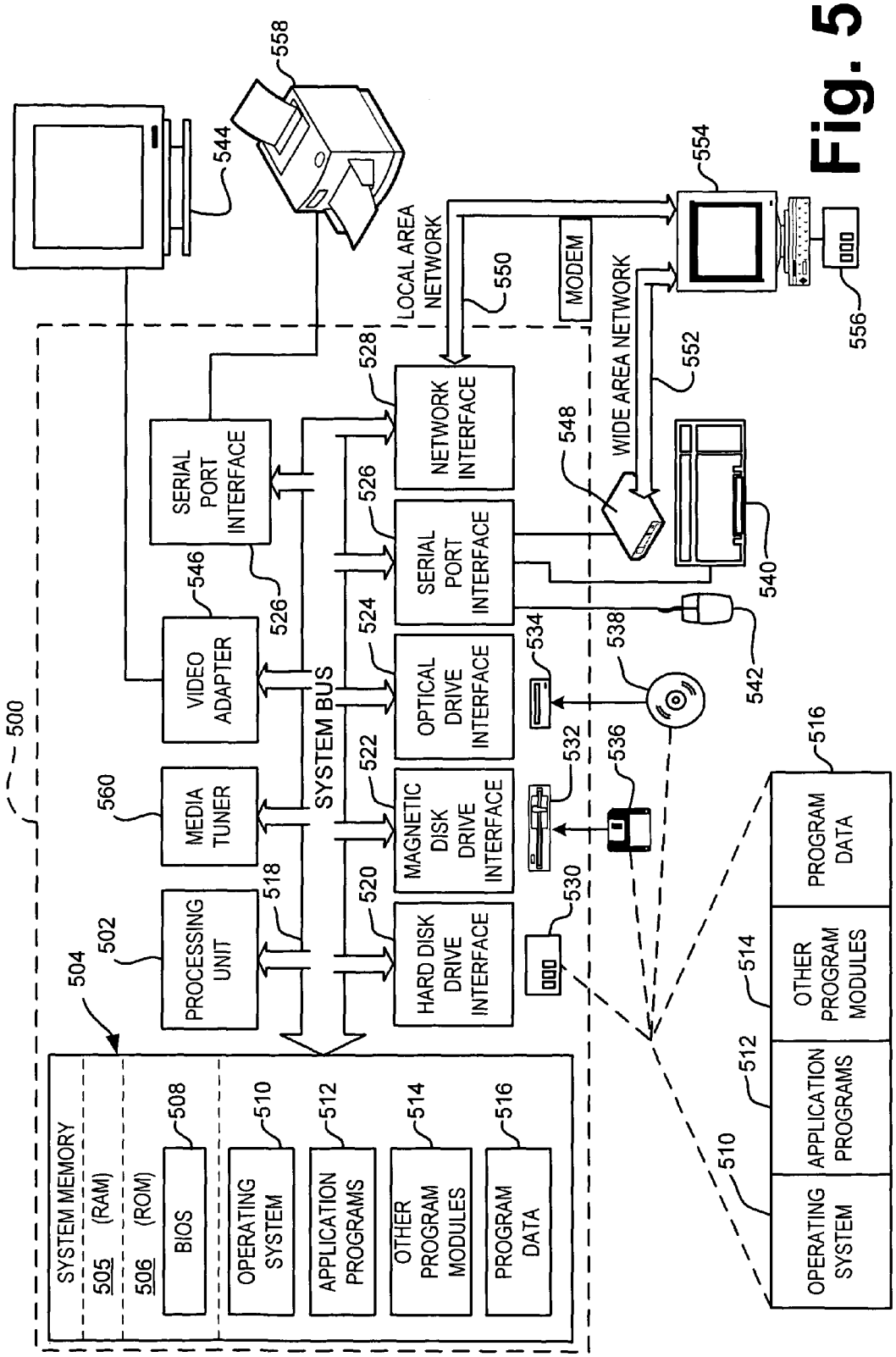

COMPOSITION OF LOCAL USER INTERFACE WITH REMOTELY GENERATED USER INTERFACE AND MEDIA

BACKGROUND

Home entertainment networks are becoming popular and allow media stored on or accessible by a computer functioning as a media server to be presented on more traditional presentation devices, such as a television, in a separate room from the computer. In order for a television to present such media, it is often connected with a media rendering device, which in turn is connected with the computer over a home entertainment network. In addition to providing media to a remote rendering device, the computer may supply graphical components for the rendering of a user interface (UI) on the television. The media rendering device may also generate UI components for presentation on the television. The media rendering device may composite the UI components received from the computer with the UI components generated locally on the device. The media rendering device performs this compositing operation without regard to any conflict between the UI components. Thus, the resulting presentation on the television may be composed of overlapping graphics or graphics that obscure the media presentation.

SUMMARY

Functionality is provided to a media server within a home entertainment network to intelligently coordinate the presentation of UIs generated both at the media server and locally on a networked media receiver. The media receiver may be connected with a presentation device such as a television or other display device and loudspeakers for presentation of the media and the UIs. By using a command and control backchannel over the network, the media server may receive information regarding the placement of UI components generated by the media receiver. In response, the media server may adjust the positioning of graphics, media control information, metadata, media presentation windows, and other UI components for rendering by the media receiver such that the UI components generated by the media server complement or do not interfere with the UI generated by the media receiver. Similarly, the media receiver may receive information regarding the placement of UI components generated by the media server. In response, the media receiver may adjust the positioning of UI components that are generated by the media receiver such that they complement or do not interfere with UI components generated by the media server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following Detailed Description of various embodiments and implementations as further illustrated in the accompanying drawings and defined in the appended claims.

BRIEF DESCRIPTION OF THE DRAWINGS

FIG. 5 is a schematic diagram of a general purpose computing system for implementing aspects of the home entertainment environment.

DETAILED DESCRIPTION

Figure 1:
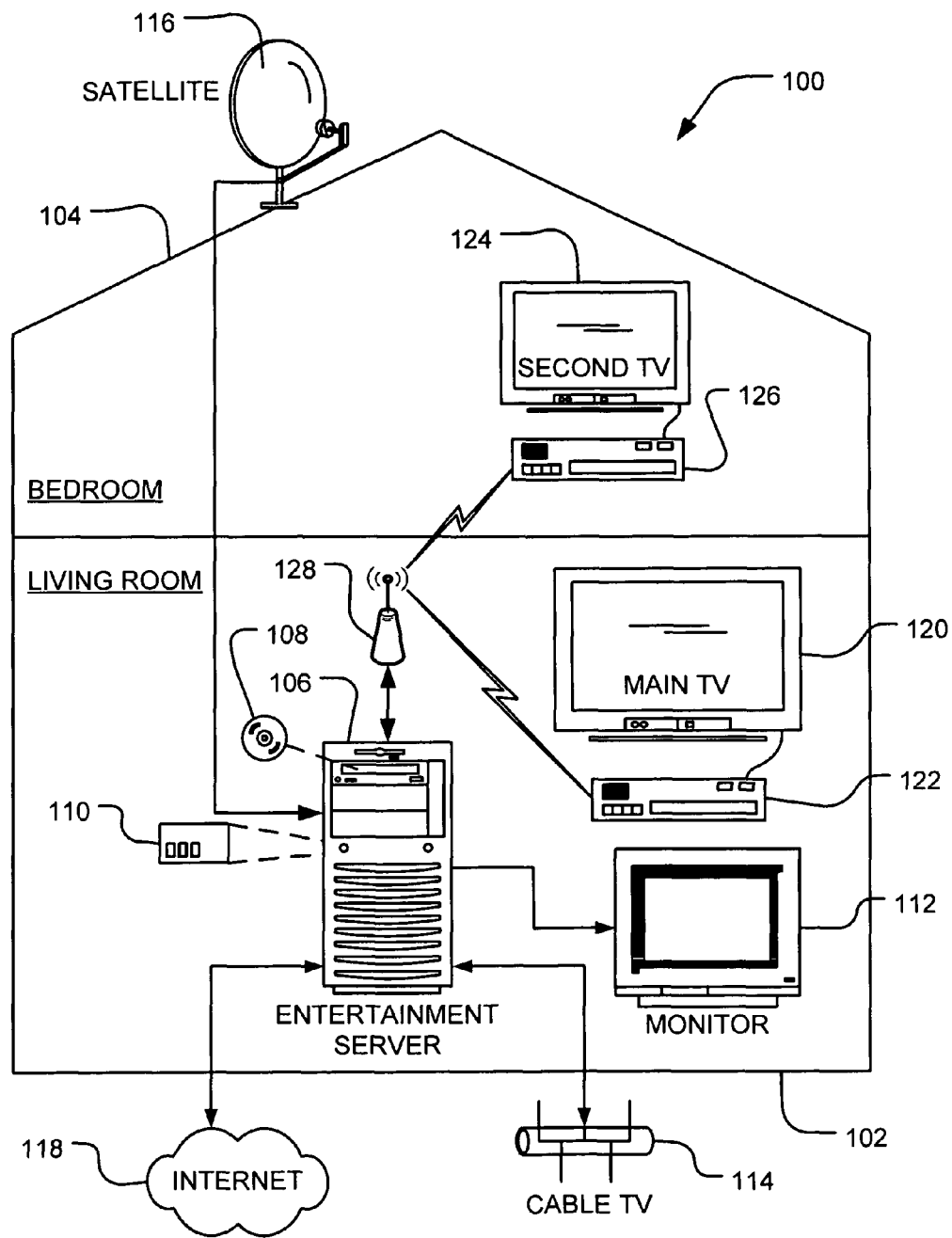
FIG. 1 is a schematic diagram of an implementation of a home entertainment environment.

Coordination of media and UI on a presentation device may be understood in the context of a media server network. FIG. 1 depicts an exemplary home entertainment environment 100 including a living room 102 and a bedroom 104. Central to the home entertainment environment 100 is a media server 106, in this implementation situated in the living room 102, but it could be located anywhere within the house. In one implementation, the media server 106 is a conventional personal computer (PC) configured to run a multimedia software package, for example, the Windows® XP Media Center Edition operating system (Microsoft Corporation, Redmond Wash.). In such a configuration, the media server 106 is able to integrate full computing functionality with a complete home entertainment system into a single PC. For example, a user can watch television (TV) in one graphical window of a video monitor, while sending email or working on a spreadsheet in another graphical window on the same monitor. In addition, the media server 106 may also include other features or components, for example: a personal video recorder (PVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG).

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive emails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of contents. Alternately, the user may employ an SD tuner for SD content and an HD tuner for HD content separately.

The TV content may be received as an analog (i.e., radio frequency) signal or a digital signal (e.g., digital cable). The received TV content may include discrete content packets, where each content packet includes actual TV content (i.e., audio and video data) and a policy or policies associated with the actual TV content. If TV content is received as an analog signal, discrete content packets may be created from the analog signal.

Digital rights management (DRM) policies may be employed to protect the actual TV content or video content digitally stored on the media server 106. Licenses may therefore be associated with the actual TV or video content. A license identifies keys used to decrypt video and TV content (e.g., content packets) that are encrypted as part of DRM. In particular, the keys are used to allow consumption or use of the actual video and TV content. In certain implementations, the content packets of received TV content may be encrypted or compressed. Encrypted content packets are typically decrypted with keys transmitted to or resident at the playback device or home network devices 122, 126.

The home environment 100 may also include one or more network devices functioning as media receivers 122, 126 placed in communication with the media server 106 through a network 128, for example, a local area network (LAN). In an exemplary embodiment, the media receivers 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Furthermore, the media receivers 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the media receivers 122, 126, and any other connected device through packet-based communication protocols, such as transmission control protocol (TCP), Internet protocol (IP), real-time transport protocol (RTP), and real-time transport control protocol (RTCP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the media receivers 122, 126. As shown in the example of FIG. 1, the main TV 120 and the secondary TV may be coupled to the media receivers 122, 126 through conventional cables. The video monitor 112 may be coupled with the media server 106 directly via a video cable. The media server 106 and media receivers 122, 126 may also or alternatively be coupled with any of a variety of video and audio presentation devices. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via any of the network protocols described above. The streamed media content may comprise video IP, SD, and HD content, including video, audio, and image files, decoded on the home network devices 122, 126 for presentation on the connected TVs 120, 124. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard remote desktop protocol (RDP), graphics device interface (GDI), or hypertext markup language (HTML).

In addition to the media receivers 122, 126 and the video display devices 112, 120, 124, the media server 106 may be connected with other peripheral devices, including components such as digital video recorders (DVR), cable or satellite set-top boxes, speakers, and a printer (not shown for the sake of graphic clarity). The media server 106 may also enable multi-channel output for speakers. This may be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
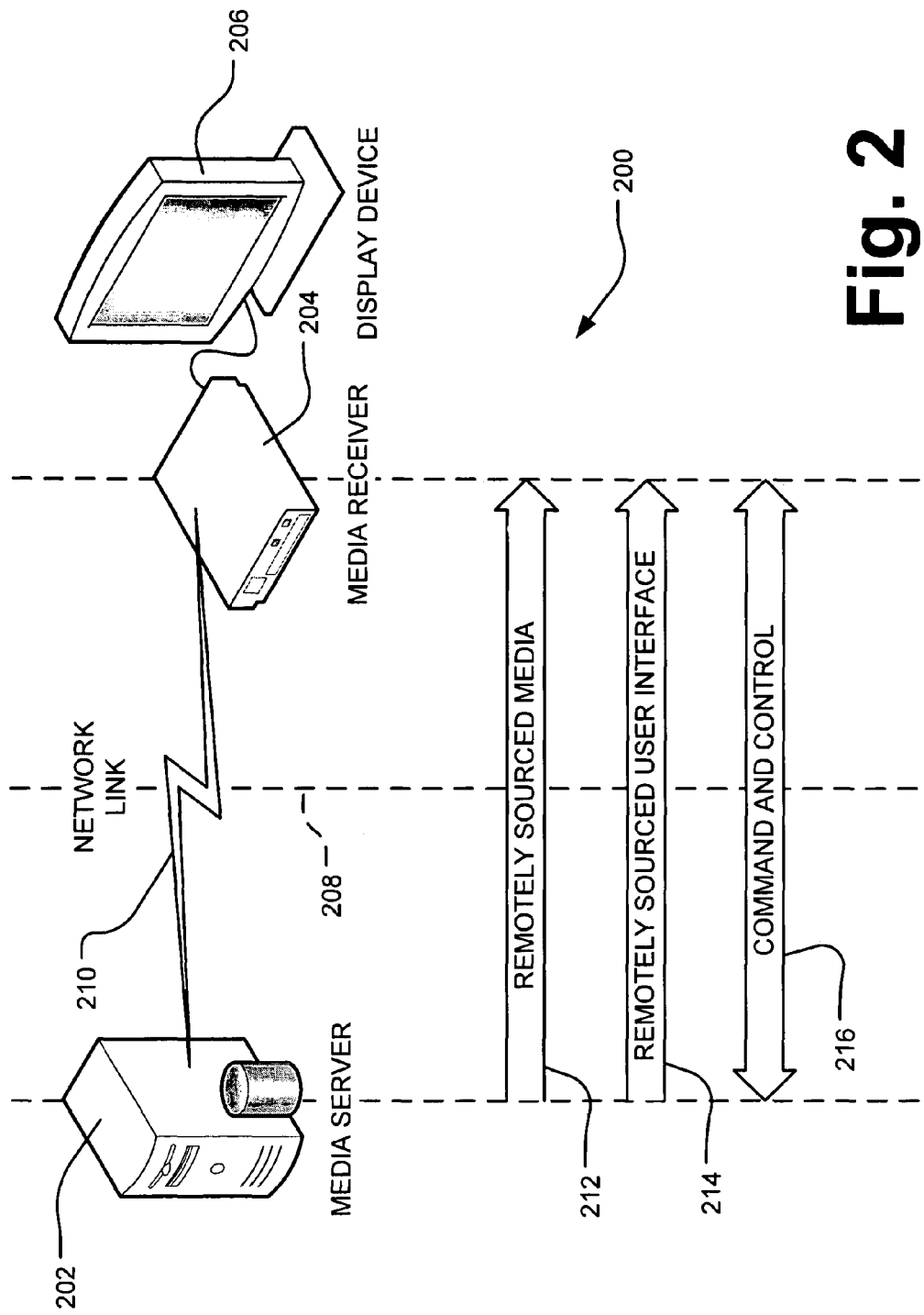
FIG. 2 is a schematic diagram of an implementation of a communication configuration between a media server and a media receiver.

FIG. 2 provides an overview of an implementation of a physical configuration 200 for coordinating playback of media content and presentation of user interface components, in particular audio/video content, on a media receiver 204 by the media server 202. As described above, the media receiver 204 may be connected via a network link 208 within a local network 210 (e.g., an IP network) to a media server 202. A presentation device 206, e.g., a television or monitor, may be connected with the media receiver 204 to present the media and related UI components to the user.

As indicated in FIG. 2, in general remotely sourced media 212 and remotely sourced UI information 214 is transmitted from the media server 202 over the network link 208 to the media receiver 204. Remotely sourced media 212 may include, for example, broadcasts of programs received and tuned by the media server 202; CD or DVD playback of music or video content by the media server 202; and music, pictures, and video stored on the media server 202. Remotely sourced UI information 212 may include, for example, menu selections, logos, and meta information about media transmitted by the media server 202, e.g., song or movie titles, album or movie art, closed captioning information, media state information (e.g., play/pause/stop indications), EPG information downloaded by the media server 202, and media duration information.

In addition to the remotely sourced media 212 and remotely sourced UI information 214, command and control information 216 may also be transmitted over the network link 208 between the media server 202 and the media receiver 204. This command and control information 216 traffic may be two-way in order to allow for coordination of a composite presentation to the user on the display device 206. As used herein, the term "composite" is not meant to refer to the analog video format called "composite video." Instead, "composite" herein is meant to describe the combination or aggregation of video and UI components in a single presentation.

Figure 3:
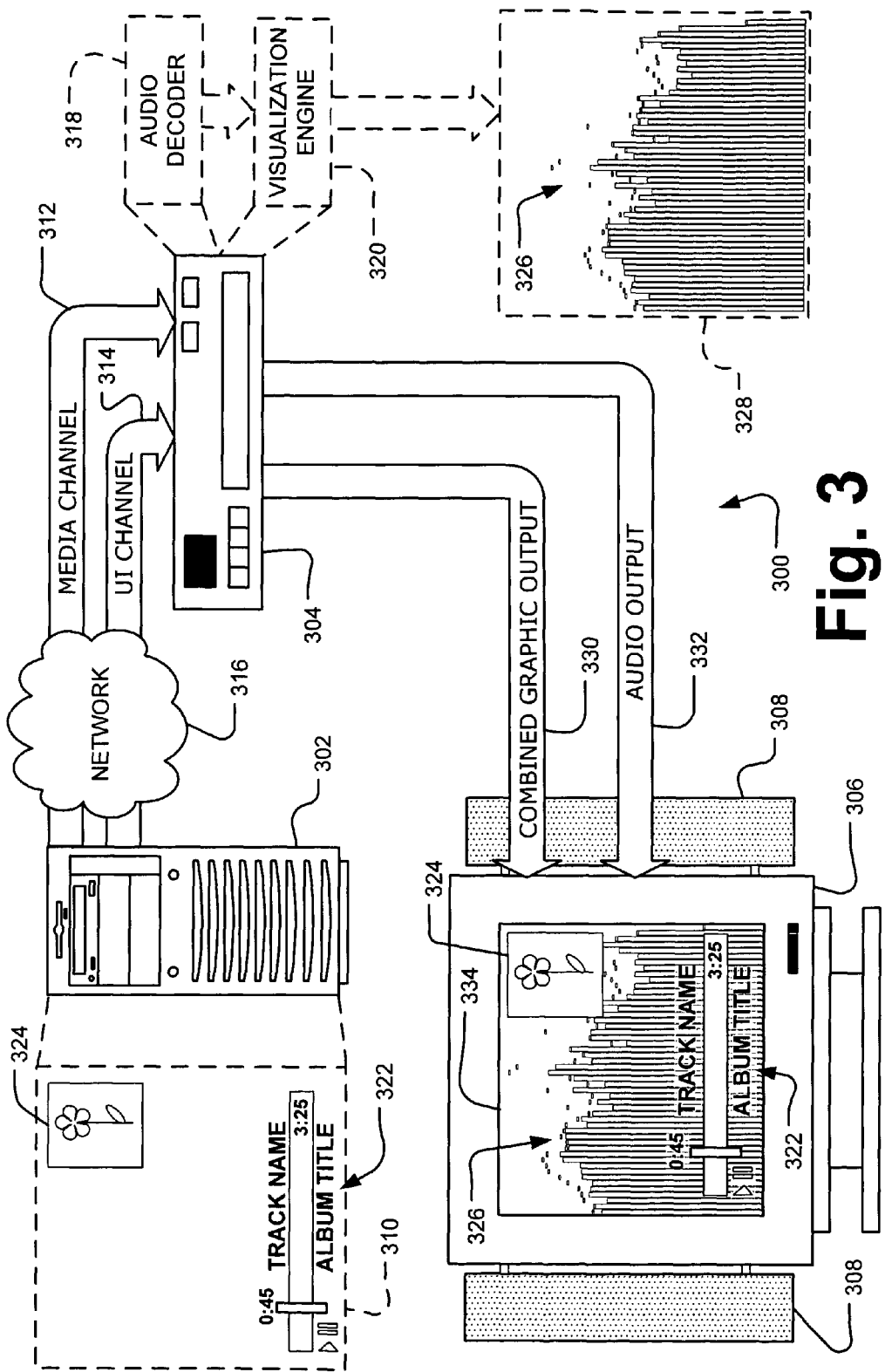
FIG. 3 is a schematic diagram of an implementation compositing on a presentation device UI and graphics from a media server and UI and graphics from a media receiver related to audio media.

FIG. 3 depicts an exemplary implementation of the composition of remotely sourced audio media and remote UI information 310 from a media server 302 with local UI 326 generated at a media receiver 304 for output and display on a display device 306 with associated loudspeakers 308. The media server 302 and the media receiver 304 are part of a home entertainment environment 300 and are connected via a network 316. The audio media is transmitted as an audio stream from the media server 302 to the media receiver 304 within a media channel 312 over the network 316. The remote UI 310 is similarly transmitted over the network 316 from the media server 302 to the media receiver 304 within a separate UI channel 314.

The remote UI 310 related to the audio media, for example, a music CD, is shown as generated by the media server 302. The remote UI 310 may be composed of playback information 322 at the bottom of the screen, which in the example of FIG. 3 includes the name of the song (Track Name), the name of the album (Album Title), play/pause indicators, the length of the song (3 min., 25 sec.), and the time elapsed in playback of the song (45 sec.). Additionally, the playback information 322 may include a graphic horizontal bar indicating the relative length of the song and a graphic vertical bar intersecting the horizontal bar and indicating the time elapsed in playback of the song. The remote UI 310 may further include a graphic or picture 324 of the album artwork associated with the particular music album.

Once the audio stream and remote UI information 310 from the media server 302 are received at the media receiver 304, the audio stream is decoded by an audio decoder module 318 within the media receiver. The audio decoder module 318 may translate the audio stream, which is generally digitally compressed, into an analog signal for transformation into sound by the loudspeakers 308 associated with the display device 306. In alternate embodiments, the loudspeakers 308 may be digital loudspeakers with the ability to directly transduce digital audio signals without intermediate decoding by the audio decoder module 318. In such embodiments, the digital audio signals may be forked by the media receiver 304 in order to provide the digital audio signals to both the loudspeakers 308 and the visualization engine 320.

The analog signal may also be passed from the audio decoder 318 to a visualization engine module 320 within the media receiver 304. The visualization engine 320 may be a software program that analyzes the frequencies and intensities of the audio signals and translates the frequencies and intensities into animated graphics. An exemplary graphic visualization 326 is depicted in FIG. 3 as an animated bar graph in which the bars represent frequencies, the heights of the bars represent intensity, and the small floating bars represent a recent maximum intensity for the particular frequency. Other animated graphic visualizations for audio signals may be generated and are well known. The graphic visualization 326 may be created by the media receiver 304 as a locally generated UI 328 for visual presentation to the user on the display device 306 to accompany the audio output on the associated loudspeakers 308.

The media receiver 304 may output the remotely generated UI 310 and the locally generated UI 328 as a combined graphic output 330 for display as a composite UI 334 on the display device 306. The media receiver 304 may simply overlay the remotely generated UI 310 on top of the locally generated UI 328 or vice versa. As shown in FIG. 3, the composite UI 334 is composed of the playback information 322 and the album picture 324 of the remote UI 310 positioned on top of the graphic visualization 326 of the local UI 328. More complicated composition schemes are possible and additional implementations are considered with respect to FIG. 4 herein. The media receiver 304 also provides an audio output 332 for playback on the loudspeakers 308 associated with the display device 306.

In this exemplary implementation the graphic visualization 326 of the locally generated UI 328 is synchronized with the audio output 332 rendered by the media receiver 304. The remotely generated UI 310 is also synchronized with the audio output 332 played over the loudspeakers 308 to graphically move the vertical bar of the playback information 322 horizontally and increment the time elapsed of the song while the song plays and stop both actions when the song is paused. When the song selection changes, the track name is changed in the remote UI 310 component of the composite UI 334. Further, when the album selection changes, the album title and the album picture 324 change in the remote UI 310 component of the composite UI 334 to reflect a different album.

Figure 4:
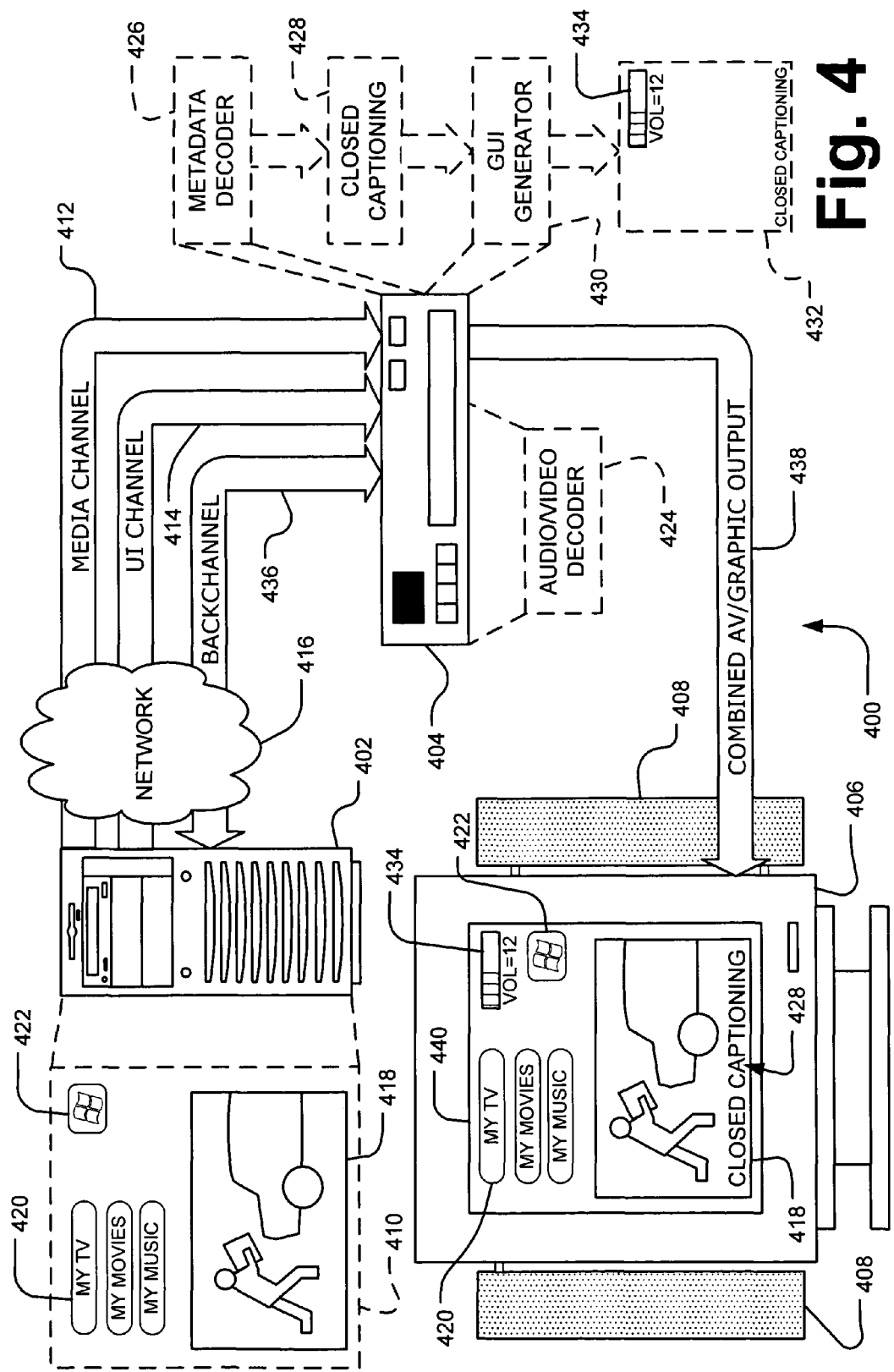
FIG. 4 is a schematic diagram of an implementation compositing on a presentation device UI and graphics from a media server and UI and graphics from a media receiver related to audio/video media.

FIG. 4 depicts an exemplary implementation of the composition of remotely sourced audio/video media and remote UI information 410 from a media server 402 with local UI 432 generated at a media receiver 404 for output and display on a presentation device 406, e.g., a video display, with associated loudspeakers 408. The media server 402 and the media receiver 404 are part of a home entertainment environment 400 and are connected via a network 416. The audio/video media is transmitted as a data stream from the media server 402 to the media receiver 404 within a media channel 412 over the network 416. The remote UI 410 is similarly transmitted over the network 416 from the media server 402 to the media receiver 404 within a separate UI channel 414. Additionally, the media server 402 and the media receiver 404 communicate with each other over the network 416 via a backchannel 436 in order to coordinate the composition of the remotely generated UI 410 and the locally generated UI 432.

The remote UI 410 related to the audio/video media, for example, a movie or television program, is shown as generated by the media server 402. The remote UI 410 may be composed of a video playback window 418 at the bottom of the screen in which the movie is presented. The remote UI 410 may also include interactive menu graphics 420 related to the software on the media server 402 for control of the home entertainment environment 400. A logo 422 identifying the presence of the home entertainment environment 400 framework may also be a part of the remotely generated UI 410. The remote UI 410 may further include a graphic or textual information (not shown) derived from metadata associated with the particular movie, for example, the movie title, the actors, director, producers, etc.

Once the audio/video stream and remote UI information 410 from the media server 402 are received at the media receiver 404, the audio/video stream is decoded by an audio/video decoder module 424 within the media receiver. The audio decoder module 424 may also translate the audio/video stream, which is generally digitally compressed, into analog video signals rendered as video frames on the presentation device 406 and analog audio signals transduced into sound by the associated loudspeakers 408. In alternate embodiments, the display device 406 and the loudspeakers 408 may be digital with the ability to directly render the digital audio/video signals without intermediate digital/analog conversion by the audio/video decoder module 424, or with partial intermediate decoding by the audio/video decoder module 424.

Once decoded, metadata associated with the video signal may also be passed from the audio/video decoder 424 to a metadata decoder module 426 within the media receiver 404. The metadata decoder 426 may be a hardware chipset or a software program that analyzes the video signal and extracts embedded data, for example, closed captioning information 428. The closed captioning information 428 or other metadata may be incorporated into a locally generated UI 432 by a graphic UI generator module 430 in the media receiver 404. The media receiver 404 may further be configured to generate additional local UI 432 components. For example, the media receiver 404 may accept remote control or push button commands from a user to control playback of the video or volume of the audio at the presentation device 406. As depicted in FIG. 4, if a volume control command is received by the media receiver 404, the graphic UI generator 430 may generate a volume bar graphic 434 to visually indicate the volume level to the user. The locally generated UI 432 may be provided for visual presentation to the user on the display device 406 to accompany the audio/video output from the media stream.

The media receiver 404 may output the audio/video media, the remotely generated UI 410, and the locally generated UI 432 as a combined audio/video graphic output 438 for display as a composite UI 440 on the presentation device 406. The audio portion of the combined audio/video graphic output 438 is separated for playback on the loudspeakers 408 associated with the presentation device 406.

The media receiver 404 and the media server may coordinate the layout of the remotely generated UI 410 with the locally generated UI 428 via data exchange and command and control communications transmitted via the backchannel 436. For example, as shown in FIG. 4, the logo 422 in the remote UI 410 is originally positioned at a screen location that would interfere or overlap with the volume bar graphic 434 generated by the graphic UI generator 430 for the local UI 432. In some implementations, this conflict may arise because the manufacturer of the media receiver 404 may be different from the manufacturer of the multimedia software creating the home entertainment environment 400. The media receiver 404 may have default positions for UI components generated locally that cannot be changed. In such a situation, this information can be transmitted to the media server 402 via the backchannel 436 and the remote UI 410 can be altered to accommodate the local UI 432. This alteration can be seen in the composite UI 440 wherein the position of the logo 422 has been adjusted downward to accommodate the volume bar graphic 434.

In the exemplary implementation of FIG. 4, the closed captioning information 428 of the locally generated UI 432 is superimposed over the video output presented in the video window 418 of the composite UI 440. The logo 422 in the remotely generated UI 410 is adjusted to accommodate the position of the volume bar graphic 434 as described above. The menu graphics 420 are also presented on the composite UI 440. The menu graphics 420 may be altered in real time to respond to user input received at the media receiver 404 and transmitted to the media server 402 via the backchannel 436. In this manner, the user can control the functions of the media server 402, for example, the selection of a new movie or song stored on the media server 402, through input at the media receiver 404. Such user input information then may dynamically affect the generation of both the remote UI 410 and the local UI 432, and thus ultimately the resulting composite UI 440.

An exemplary hardware and operating environment for implementing the invention is depicted in FIG. 5. As indicated above, the media server and the media receiver devices may comprise general purpose computing devices. A general purpose computing device may be the form of a computer 500, including a processing unit 502, a system memory 504, and a system bus 518 that operatively couples various system components, including the system memory 504 to the processing unit 502. There may be only one or there may be more than one processing unit 502, such that the processor of computer 500 comprises a single central processing unit (CPU), or a plurality of processing units, commonly referred to as a parallel processing environment. The computer 500 may be a conventional computer, a distributed computer, or any other type of computer; the invention is not so limited.

The system bus 518 may be any of several types of bus structures including a memory bus or memory controller, a peripheral bus, a switched fabric, point-to-point connections, and a local bus using any of a variety of bus architectures. The system memory 504 may also be referred to as simply the memory, and includes read only memory (ROM) 506 and random access memory (RAM) 505. A basic input/output system (BIOS) 508, containing the basic routines that help to transfer information between elements within the computer 500, such as during start-up, is stored in ROM 506. The computer 500 further includes a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM, DVD, or other optical media.

The hard disk drive 530, magnetic disk drive 532, and optical disk drive 534 are connected to the system bus 518 by a hard disk drive interface 520, a magnetic disk drive interface 522, and an optical disk drive interface 524, respectively. The drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, may be used in the exemplary operating environment.

A number of program modules may be stored on the hard disk 530, magnetic disk 532, optical disk 534, ROM 506, or RAM 505, including an operating system 510, one or more application programs 512, for example, a multimedia software package, other program modules 514, for example, a visualization engine, an audio/video decoder, a UI generator, and a metadata decoder, and program data 516, for example, media content. A user may enter commands and information into the personal computer 500 through input devices such as a keyboard 540 and pointing device 542, for example, a mouse. Other input devices (not shown) may include, for example, a microphone, a joystick, a game pad, a tablet, a touch screen device, a satellite dish, a scanner, a facsimile machine, and a video camera. These and other input devices are often connected to the processing unit 502 through a serial port interface 526 that is coupled to the system bus 518, but may be connected by other interfaces, such as a parallel port, game port, or a universal serial bus (USB).

A monitor 544 or other type of display device is also connected to the system bus 518 via an interface, such as a video adapter 546. In addition to the monitor 544, computers typically include other peripheral output devices, such as a printer 558 and speakers (not shown). These and other output devices are often connected to the processing unit 502 through the serial port interface 526 that is coupled to the system bus 518, but may be connected by other interfaces, such as a parallel port, game port, or a universal serial bus (USB). In the case of a media server, a tuner 560 may also be connected with the system bus in order to receive and convert analog content signals into digital format and similarly convert digital content into analog signals for transmission to connected devices.

The computer 500 may operate in a networked environment using logical connections to one or more remote computers, such as remote computer 554. These logical connections may be achieved by a communication device coupled to or integral with the computer 500; the invention is not limited to a particular type of communications device. The remote computer 554 may be another computer, a server, a router, a network personal computer, a client, a peer device, or other common network node, and typically includes many or all of the elements described above relative to the computer 500, although only a memory storage device 556 has been illustrated in FIG. 5. The logical connections depicted in FIG. 5 include a wired or wireless local-area network (LAN) 550, for example, an Ethernet network, or a WiFi network, and a wide-area network (WAN) 552, for example, a cable network or a telephony network. Such networking environments are commonplace in office networks, enterprise-wide computer networks, intranets and the Internet, which are all types of networks.

When used in a LAN 550 environment, the computer 500 may be connected to the local network 550 through a network interface or adapter 528, which is one type of communications device. When used in a WAN 552 environment, the computer 500 typically includes a modem 548, a network adapter, or any other type of communications device for establishing communications over the wide area network 552. The modem 548, which may be internal or external, is connected to the system bus 518 via the serial port interface 526. In a networked environment, program modules depicted relative to the personal computer 500, or portions thereof, may be stored in a remote memory storage device. It is appreciated that the network connections shown are exemplary and other means of and communications devices for establishing a communications link between the computers may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method comprising:
transmitting, by a media server over a home network via a media channel, media content to a media receiver, wherein:
the media receiver provides a local user interface for presenting the media content on a screen of a presentation device connected to the media receiver, and
the local user interface is configured to present local user interface components for controlling playback of the media content on the screen of the presentation device at default positions in response to particular control commands received by the media receiver;
generating, by the media server, a remote user interface to be combined with the local user interface provided by the media receiver, wherein the remote user interface includes:
a playback window for presenting the media content, and
remote user interface components including descriptive information associated with the media content and menu graphics for selecting other media content stored on the media server;
receiving, by the media server over the home network via a separate backchannel, compositing information from the media receiver, wherein the compositing information includes the default positions of the local user interface components for controlling playback of the media content;
determining, by the media server based on the compositing information, whether positions of the remote user interface components within the remote user interface conflict with the default positions of the local user interface components for controlling playback of the media server content;
adjusting, by the media server based on the compositing information, the positions of one or more remote user interface components within the remote user interface when a conflict is determined to accommodate the local user interface components for controlling playback of the media content; and
transmitting, by the media server over the home network via a user interface channel, the remote user interface to the media receiver for creation of a composite presentation to be presented on the screen of the presentation device, wherein:
the composite presentation combines the local user interface provided by the media receiver and the remote user interface generated by the media server,
the composite presentation presents the media content within the playback window of the remote user interface,
the descriptive information and the menu graphics are presented within the composite presentation at positions that avoid conflict with the default positions of the local user interface components for controlling playback of the media content,
the menu graphics respond to user input received at the media receiver and transmitted to the media server over the home network via the backchannel, and
the composite presentation is configured to present the local user interface components for controlling playback of the media content on the screen of the presentation device at the default positions in response to the particular control commands received by the media receiver.

2. The method of claim 1, further comprising:
generating, by the media server, additional compositing information related to the remote user interface generated by the media server; and
transmitting, by the media server, the additional compositing information to the media receiver for creation of the composite presentation.

3. The method of claim 1, wherein the local user interface is provided by the media receiver based, at least in part, upon metadata extracted from the media content received from the media server.

4. The method of claim 1, further comprising:
receiving, at the media server, metadata extracted from the media content by the media receiver.

5. The method of claim 4, wherein the remote user interface is generated by the media server based, at least in part, upon the metadata received from the media receiver.

6. The method of claim 1, wherein the local user interface is provided by the media receiver based, at least in part, upon the media content received from the media server.

7. The method of claim 1, further comprising:
extracting, by the media server, metadata from the media content; and
incorporating, by the media server, the descriptive information into the remote user interface based on the metadata.

8. A computer-readable storage device storing computer-executable instructions implementing the method of claim 1.

9. A media server comprising:
a processor configured to execute computer-executable instructions; and
memory storing computer-executable instructions for:
transmitting, by the media server over a home network via a media channel, media content to a media receiver, wherein:
the media receiver provides a local user interface for presenting the media content on a screen of a presentation device connected to the media receiver, and
the local user interface is configured to present local user interface components for controlling playback of the media content on the screen of the presentation device at default positions in response to particular control commands received by the by the media receiver;
generating, by the media server, a remote user interface to be combined with the local user interface provided by the media receiver, wherein the remote user interface includes:
a playback window for presenting the media content, and
remote user interface components including descriptive information associated with the media content and menu graphics for selecting other media content stored on the media server;
receiving, by the media server over the home network via a separate backchannel, compositing information from the media receiver, wherein the compositing information includes the default positions of the local user interface components for controlling playback of the media content;
determining, by the media server based on the compositing information, whether positions of the remote user interface components within the remote user interface conflict with the default positions of the local user interface components for controlling playback of the media content;
adjusting, by the media server based on the compositing information, the positions of one or more remote user interface components within the remote user interface when a conflict is determined to accommodate the local user interface components for controlling playback of the media content; and
transmitting, by the media server over the home network via a user interface channel, the remote user interface to the media receiver for creation of a composite presentation to be presented on the screen of the presentation device, wherein:
the composite presentation combines the local user interface provided by the media receiver and the remote user interface generated by the media server,
the composite presentation presents the media content within the playback window of the remote user interface,
the descriptive information and the menu graphics are presented within the composite presentation at positions that avoid conflict with the default positions of the local user interface components for controlling playback of the media content,
the menu graphics respond to user input received at the media receiver and transmitted to the media server over the home network via the backchannel, and
the composite presentation is configured to present the local user interface components for controlling playback of the media content on the screen of the presentation device at the default positions in response to the particular control commands received by the media receiver.

10. The media server of claim 9, wherein the memory further stores computer-executable instructions for:
extracting metadata from the media content; and
incorporating the descriptive information into the remote user interface based on the metadata.

11. The media server of claim 9, wherein the memory further stores computer-executable instructions for:
generating additional compositing information related to the remote user interface; and
transmitting the additional compositing information to the media receiver for creation of the composite presentation.

12. A method comprising:
receiving, by a media receiver over a home network via a media channel, media content transmitted by a media server, wherein:
the media receiver provides a local user interface for presenting the media content on a screen of a presentation device connected to the media receiver, and
the local user interface is configured to present local user interface components for controlling playback of the media content on the screen of the presentation device at default positions in response to particular control commands received by the by the media receiver;
transmitting, by the media receiver over the home network via a separate backchannel, compositing information to the media server, wherein the compositing information includes the default positions of the local user interface components for controlling playback of the media content;

receiving, by the media receiver over the home network via a user interface channel, a remote user interface generated by the media server, wherein:
- the remote user interface includes a playback window for presenting the media content,
- the remote user interface includes remote user interface components including descriptive information associated with the media content and menu graphics for selecting other media content stored on the media server,
- the remote user interface avoids positions of the remote user interface components within the remote user interface conflicting with the default positions of the local user interface components for controlling playback of the media content, and
- the media server is configured to adjust the positions of one or more user remote interface components within the remote user interface when a conflict is determined based, at least in part, on the compositing information transmitted by the media receiver; and outputting, by the media receiver, a composite presentation to the presentation device, wherein:
- the composite presentation combines the local user interface provided by the media receiver and the remote user interface generated by the media server,
- the composite presentation presents the media content within the playback window of the remote user interface,
- the descriptive information and the menu graphics are presented within the composite presentation at positions that avoid conflict with the default positions of the local user interface components for controlling playback of the media content,
- the menu graphics respond to user input received at the media receiver and transmitted to the media server over the home network via the backchannel, and
- the composite presentation is configured to present the local user interface components for controlling playback of the media content on the screen of the presentation device at the default positions in response to the particular control commands received by the media receiver.

13. The method of claim 12, wherein the local user interface is provided by the media receiver based, at least in part, upon the media content.

14. The method of claim 12, further comprising:
receiving, by the media receiver, additional compositing information related to the remote user interface generated by the media server; and
using, by the media receiver, the additional compositing information for creation of the composite presentation.

15. A computer-readable storage device storing computer-executable instructions implementing the method of claim 12.

16. The method of claim 1, wherein the particular control commands control playback of video and control volume of audio.

17. The media server of claim 9, wherein the particular control commands control playback of video and control volume of audio.

18. The method of claim 12, wherein the particular control commands control playback of video and control volume of audio.

19. The method of claim 1, further comprising:
receiving, by the media server over the home network via the backchannel, user input indicating a selection of other media content stored on the media server; and
transmitting, by the media server over the home network via the user interface channel, a new remote user interface to the media receiver for creation of a new composite presentation to be presented on the screen of the presentation device.

20. The media server of claim 9, wherein the memory further stores computer-executable instructions for:
receiving, by the media server over the home network via the backchannel, user input indicating a selection of other media content stored on the media server; and
transmitting, by the media server over the home network via the user interface channel, a new remote user interface to the media receiver for creation of a new composite presentation to be presented on the screen of the presentation device.

* * * * *